Feb. 23, 1926.
C. L. WALKER
1,574,219
CRANK SHAFT
Filed April 26, 1924    2 Sheets-Sheet 1
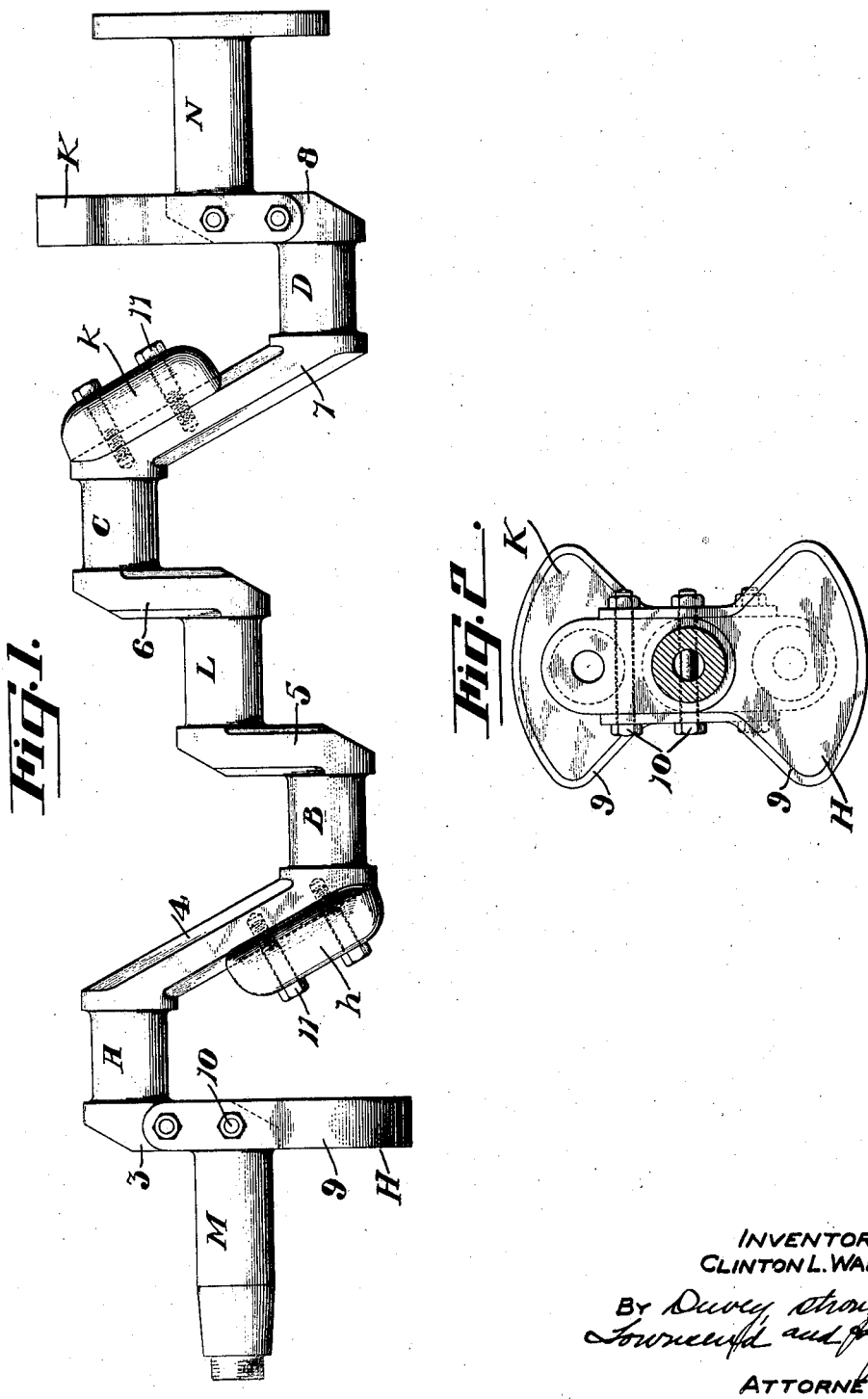
INVENTOR.
CLINTON L. WALKER.
ATTORNEYS.

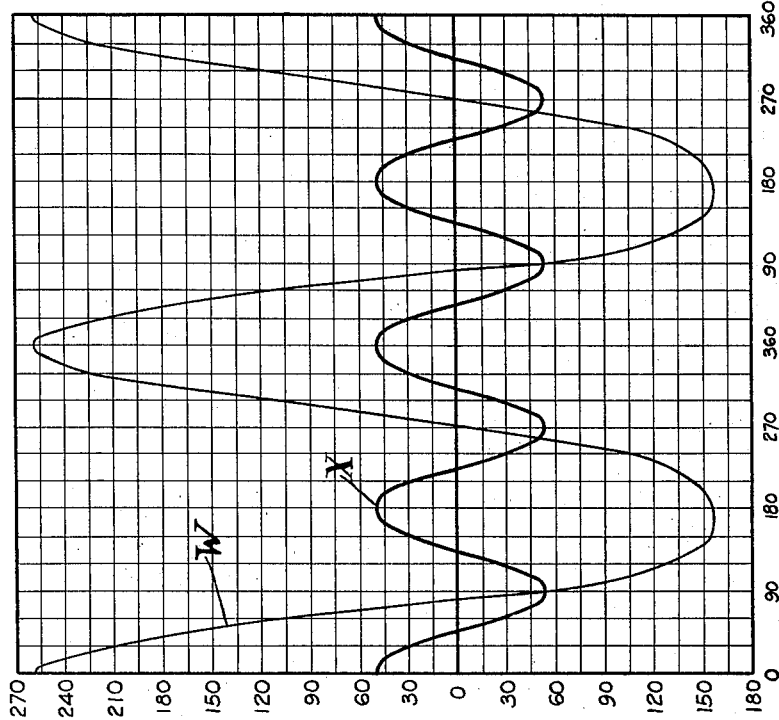

Patented Feb. 23, 1926.

1,574,219

UNITED STATES PATENT OFFICE.

CLINTON L. WALKER, OF PIEDMONT, CALIFORNIA.

CRANK SHAFT.

Application filed April 26, 1924. Serial No. 709,298.

*To all whom it may concern:*

Be it known that I, CLINTON L. WALKER, a citizen of the United States, residing at Piedmont, county of Alameda, and State of California, have invented new and useful Improvements in Crank Shafts, of which the following is a specification.

This invention relates to a crank shaft, and particularly to a four-throw crank shaft such as employed in four-cylinder internal combustion engines and the like.

The object of the present invention is to generally improve and simplify the construction and operation of crank shafts of the character described; to reduce and neutralize inertia forces caused by reciprocating parts; to neutralize any inertia forces caused by the webs and crank pins of the shaft, and further, to so position the cranks that excessive intermittent bearings pressures are materially reduced and a substantially uniform continuous bearing pressure obtained.

For the purpose of clearly describing and illustrating the crank shaft, reference will be made to the accompanying specification and drawings, in which—

Fig. 1 is a side elevation of the crank shaft.

Fig. 2 is an end view of the same.

Fig. 3 is a diagrammatic view of the crank shaft.

Fig. 4 is a diagrammatic view showing a conventional form of four-throw crank shaft.

Fig. 5 is a diagram showing the inertia forces caused by the reciprocating parts resolved into their vertical and horizontal components.

Referring to the drawings in detail, and particularly to Figs. 1 and 2, it will be noted that the crank shaft illustrated employs three bearings, a center bearing L, and a pair of end bearings M and N. The crank shaft is otherwise provided with four crank pins, as indicated at A, B, C and D, and these are supported with relation to the shaft by means of webs such as illustrated at 3, 4, 5, 6, 7 and 8. The crank pins, together with the webs supporting the same, are arranged on a common plane; the cranks A and B being disposed opposite each other or 180° apart, the cranks B and C being similarly placed opposite each other or 180° apart, and the cranks C and D being also placed opposite each other and therefore 180° apart. All adjacent cranks are for this reason opposed to each other and so are cranks A and D, and similarly cranks B and C. This is exceedingly important as this particular arrangement of the cranks permits substantial neutralization of certain inertia forces and also reduces bearing pressures to a minimum, as will hereinafter be described.

The shaft is otherwise provided with counterweights as indicated at H, K, h and k; the larger counterweights H and K being secured to the crank webs 3 and 8 by means of straps and bolts indicated at 9 and 10, respectively, and the smaller counterweights h and k being secured to the webs 4 and 7 by bolts as indicated at 11.

The method of positioning the counterweights and determining the weight of the same will not be considered in detail in the present application as it forms the subject-matter of my co-pending application entitled "Method of counterbalancing engine main shafts", filed February 4, 1924, Serial No. 690,682.

For the purpose of clearly bringing out the advantags of a shaft constructed as here described, reference will be made to the diagrammatic illustration of a conventional form of four-throw crank shaft such as illustrated in Fig. 4. Fig. 4 shows a three-bearing four-throw shaft with the cranks set on a common plane. This particular construction causes the crank pins $2^a$ and $3^a$ to align and similarly the crank pins $1^a$ and $4^a$. Crank pins $1^a$ and $2^a$ are opposed to each other and spaced 180° apart and so are the crank pins $3^a$ and $4^a$. It will, however, be noted that the cranks $2^a$ and $3^a$ are aligned and similarly the cranks $1^a$ and $4^a$. This is objectionable as excessive intermittent bearing pressures are exerted, particularly on the center bearing indicated at 20, as crank pins $2^a$ and $3^a$ are aligned and as such travel in unison.

The combined inertia forces of the crank webs and pins and the connecting rods and pistons connected therewith are thus imposed upon the center bearing in unison, and it is for this reason that the center bearing is subjected to unnecessary pressures.

By referring to Fig. 3, which is a diagrammatic view of the shaft forming the subject-matter of the present application, it will be noted that the crank pins $2^b$ and $3^b$ are opposed to each other and that due to this positioning of the pins inertia forces of the cranks, connecting rods and pistons are neutralized. The center bearing is thus relieved of substantially all inertia pressure.

The crank pins 1$^b$ and 4$^b$ are similarly opposed to each other and the inertia forces imposed thereon are therefore also materially reduced. The bearing pressures will accordingly be substantially constant and uniform and excess bearing pressures intermittently applied, as when the pins are placed in alignment as shown in Fig. 4, are entirely avoided.

To further illustrate the advantages obtained by the positioning of the cranks as shown in Figs. 1 and 3, reference will be made to Fig. 5, which is a diagram showing the inertia forces caused by the reciprocating parts resolved into their vertical and horizontal components. A predetermined condition will be considered: The diagram is developed from a four-cylinder Buick motor, four and one-half inch cylinder diameter by five inch stroke. The weight of the reciprocating parts, to-wit, piston and connecting rod assembly, is approximately nine pounds for each cylinder and the revolutions are 1800 R. P. M. A conventional shaft such as illustrated in Fig. 4 was first tested. The inertia forces produced are illustrated by the line W. By following this line it will be noted that at the upper end of each stroke a maximum inertia force of 270 pounds is reached, and at the lower end of the stroke a maximum of approximately 160 pounds pressure is reached. The second curved line indicated at X was produced by employing a shaft such as shown in Figs. 1 and 3. The maximum inertia force produced during the upstroke was approximately 50 pounds and the maximum inertia force reached during the downward stroke was similarly approximately 50 pounds. The inertia forces were computed in connection with the center bearing in each instance and it certainly shows that a material reduction in bearing pressure is obtained when comparison is made between the two shafts.

The results obtained with the shaft structure forming the subject-matter of the present application are, a material reduction in vibration due to the possibility of substantially neutralizing the inertia forces of reciprocating parts, and a uniform continuous bearing pressure.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. A crank shaft provided with four cranks, a pair of end webs and intermediate webs, the center cranks being set 180° apart and the end cranks being set 180° with relation to the adjacent center cranks and 180° with relation to each other, and all cranks being arranged on a common plane and said cranks being disposed in pairs, and a pair of counterweights one opposite to each endmost web and forming an extension of said webs.

2. A shaft of the character described, having a center bearing and a pair of end bearings, two pairs of cranks formed on the shaft one pair on each side of the center bearing, the cranks in each pair being set 180° apart and the adjacent center cranks 180° apart, and all cranks being arranged on a common plane, a centrally disposed web member connecting the cranks in each pair, a counterweight on each of said webs, an end web on each end of the shaft, and a counterweight on each of said webs.

3. A crank shaft provided with four cranks, the center cranks being set 180° apart and the end cranks being set 180° with relation to the adjacent center cranks, and 180° with relation to each other and all cranks being arranged on a common plane, said cranks being disposed in pairs, a centrally disposed web member connecting the cranks in each pair, a counterweight on each of said webs, and end bearings supporting the shaft.

4. A crank shaft provided with four cranks, the center cranks being set 180° apart and the end cranks being set 180° with relation to the adjacent center cranks, and 180° with relation to each other and all cranks being arranged on a common plane, said cranks being disposed in pairs, a centrally disposed web member connecting the cranks in each pair, a counterweight on each of said webs, an end web on each end of the shaft, a counterweight on each of said webs, and an end bearing connected with each of said end webs.

CLINTON L. WALKER.